United States Patent [19]

Margolis

[11] Patent Number: 5,191,469
[45] Date of Patent: Mar. 2, 1993

[54] AFOCAL VARIATION FOCUSING SYSTEM FOR MIRRORED OPTICAL SYSTEMS

[76] Inventor: H. Jay Margolis, 704 Mohawk Dr., #15, Boulder, Colo. 80303

[21] Appl. No.: 606,045

[22] Filed: Oct. 30, 1990

Related U.S. Application Data

[63] Continuation-in-part of Ser. No. 342,179, Apr. 4, 1989, Pat. No. 5,054,896, which is a continuation-in-part of Ser. No. 286,307, Dec. 19, 1988, Pat. No. 4,988,173, which is a continuation-in-part of Ser. No. 169,271, May 17, 1988, abandoned.

[51] Int. Cl.$^5$ .............................................. G02B 23/00
[52] U.S. Cl. ..................... 359/366; 359/399; 359/425; 359/432; 359/435
[58] Field of Search ............... 359/744, 425, 426, 432, 359/785, 786, 787, 435, 405, 399

[56] References Cited

U.S. PATENT DOCUMENTS

| | | | |
|---|---|---|---|
| 3,752,559 | 8/1973 | Fletcher et al. | 359/366 |
| 4,318,585 | 3/1982 | Matsumura | 359/425 |
| 4,718,753 | 1/1988 | Gebelein | 359/399 |
| 4,988,173 | 1/1991 | Margolis | 359/676 |
| 5,054,896 | 10/1991 | Margolis | 359/676 |

Primary Examiner—Scott J. Sugarman
Attorney, Agent, or Firm—Donald W. Margolis

[57] ABSTRACT

In this system a module carries an afocal variator optical system, and to which module a front partially-obscured reflecting telescopical system and a rear system module can be substantially permanently connected in combination to vary the actual focal length of the front partially-obscured reflecting telescopical system in conjunction with a rear system module without the need to physically change the length dimension of any system, or without the need to change the mirror position or positions of the front module. A partially-obscured reflecting telescopical system is defined as any selected from the group Newtonian, Cassegrain, Ritchey-Chretien, Gregorian and any of their derivatives, including catadioptric derivatives, such as Maksutov and Schmidt types, in which the incoming light is obscured by a central disk with reflecting obverse side, diagonal mirror or pickoff mirror essentially on-axis to the incoming light.

18 Claims, 1 Drawing Sheet

AFOCAL VARIATION FOCUSING SYSTEM FOR MIRRORED OPTICAL SYSTEMS

RELATED APPLICATIONS

This application is a continuation-in-part of U.S. patent application Ser. No. 342,179, now U.S. Pat. No. 5,054,896, entitled CONTINUOUSLY FOCUSABLE MICROSCOPE INCORPORATING AN AFOCAL VARIATOR OPTICAL SYSTEM filed by H. Jay Margolis on Apr. 4, 1989, which is in turn a continuation-in-part of U.S. patent application Ser. No. 286,307, now U.S. Pat. No. 4,988,173, entitled MODULAR AFOCAL VARIATOR OPTICAL FOCUSING SYSTEM filed by H. Jay Margolis on Dec. 19, 1988, which is in turn a continuation-in-part of U.S. patent application Ser. No. 169,271, also entitled MODULAR AFOCAL VARIATOR OPTICAL FOCUSING SYSTEM filed by H. Jay Margolis on May 17, 1988, and now abandoned.

BACKGROUND OF THE INVENTION a) Field of the Invention

This invention relates to an afocal variation focusing system for use with mirrored optical systems, and especially for partially-obscured reflecting telescopical systems.

b) Discussion of the Prior Art

"Varios" and "variators" are well known and useful optical systems. Such systems have found use primarily in zoom lens systems and in projectors, for example, to change the size of a projected image on a screen, but not to focus the image. In many instances, such vario and variator devices have been used, in combination with a front refracting optical system and a rear system module in slide projectors. In some instances, they have been used in combination with both a front refracting system and a rear refracting system module. However, in all known instances such optical systems which incorporate vario and variator optical systems have been used with refractor optical systems to alter the size of an image or to focus it, but not to focus the image of a front partially-obscured reflecting telescopical system.

Afocal variators of the specific type described in the present application have been known and in commercial use and on sale, by themselves, for at least seventeen years, for example for use in projector lenses to alter the size of a projected image on a screen. However, while afocal variator optical systems of the specific type disclosed herein, have been previously known in the art, such afocal variator optical systems are not known to have been previously used in the art to focus partially-obscured reflective telescopical systems in the manner disclosed, provided and claimed by the present application, as opposed to the prior art use to alter image size, or to focus refractor optical systems in which the afocal variator is positioned between front and rear optical element modules, as distinguished from use with partially-obscured reflecting telescopical systems in which the rear module is not another optical element, but is a light-reactive material, located at the final focal plane. Many of the latter uses are taught by applicant in the Related Applications listed above.

It is thus seen that while the use of varios and variators, either alone, or in combination with either a front refractive optical system and a rear refractive optical system are known, they are not known to have been used in combination with a front partially-obscured reflective telescopical system to alter active focal length so as to act as a focusing system, as opposed to a system for altering image size or focus when positioned between the elements of a complete, operational refractive optical system.

In the past, where it has been desired to alter the focal length of partially-obscured reflecting telescopical systems, this has usually been accomplished by continuously or discretely changing the length of the optical system, or by changing the location of a mirror relative to the length of the optical system, or by changing the position of one mirror relative to another, or by moving a tube in or out to subtract or add mechanical length between one mirror relative to another. Additionally, lens systems have been used to either focally compress or focally expand the light path of such telescopical systems, but such lenses are formula-specific and alter the telescopical focus within predictable limits, becoming essential parts of the imaging system itself. Altering focal length of partially-obscured reflecting telescopes without utilizing the imaging system, or changing the length of the optical system, or changing the position or location of a mirror or mirrors within a partially-obscured reflective optical system has not been known in the prior art.

In other known prior art, Hillman U.S. Pat. No. 2,937,570 discloses a telescope system in which the image forming lenses are moved in order to focus the system. That is, focusing is accomplished by moving objective lens and focusing lens, which are part of the telescope's "formula-specific" objective imaging system. Focusing is not accomplished or taught to be feasible by moving a portion of an afocal variator, nor by moving a portion of any other non-image forming modular optical lens system. Furthermore, this reference discloses a "formula-specific" optical system in which the lenses are all calculated and assembled to work together to form a telescope. It does not include an independent optical lens system module which is non-image forming. It does not include a central afocal variator module which does not comprise a portion of the image-forming optics. If any of the movable lenses of any of the systems taught by Hillman were removed, the entire system would be affected, very probably to the point that the system would no longer function for its intended purpose.

Matsumura U.S. Pat. No. 4,318,585 discloses an optical system with an afocal focusing group, but in which the afocal focusing group is a Galilean telescope system rather than an afocal variator.

Quenderff French Patent 2,572,545 teaches the use of a zoom lens to make enlarged pictures, and also teaches the use of various art known mechanical devices for connecting together optical modules. However, it neither teaches nor suggests the use of an afocal variator module as a focusing element within a partially-obscured reflective optical system.

SUMMARY OF THE INVENTION

In view of the foregoing, it is an object of the present invention to provide an optical system in which an afocal variator optical system alters the active focal length of a partially-obscured reflecting telescopical system in combination with a rear system module which is light-reactive.

It is another object of the present invention to provide a module which carries an afocal variator optical system, to which module both a front partially-obscured reflective and a rear module which carries a light-reactive material, while substantially permanently connected in combination, can be moved in or out of the optical axis of the partially-obscured reflecting telescopical system whereby one afocal variator can be exchanged for another, all the time the support for such variators is held in substantially permanent combination.

Another object of the present invention is to provide such a module which carries an afocal variator optical system which consists of a front positive lens system and a rear positive lens system which are positioned in substantially fixed spaced relation to one another, and a negative lens which is positioned between such fixed front positive and rear positive lenses, and which lens is designed and supported in the module in such a manner that it is capable of being moved toward and away from the front positive lens or toward and away from the rear positive lens.

Another object of the present invention is to provided such a module which is simple in construction and design and which lends itself to the substantially permanent attachment of both a front partially-obscured reflecting telescopical system and a rear system module carrying a light-reactive material.

Another object of the present invention is to provide ground-based partially-obscured reflecting telescopes with a means of focusing, whereby no movement of the mirror elements is necessitated, thereby reducing the costs of such telescopes.

Another object of the present invention is to provide space-borne partially-obscured reflecting telescopes with a means of focusing whereby no movement of the mirror elements is necessitated, thereby reducing the costs of such telescopes.

It is another object of the present invention to provide a means of correcting misfigured partially-obscured reflecting telescopical systems composed of two or more mirrors, which suffer from inappropriate reciprocity of one mirror with another, whereby the resetting of one mirror with another may produce a better result, in which case the new result may be a premature or extra-mature focal plane, the remaining of which to the predetermined original focal plane would be possible by means of the present invention.

It is also an object of the present invention to utilize one or more module afocal variator optical systems composed of different refractive, dispersive and spectrally-transmitting materials, whereby a wide range of electro-magnetic wavelengths can be alternately focused by moving one module out of the optical axis and replacing it by art-known means with another, all the while the support system containing such module modules remains substantially permanent.

The foregoing objects of the present invention are obtained by providing an optical system which has the ability to vary the actual focal length of a front partially-obscured reflecting telescopical system in combination with a rear element module supporting a light-reactive material, without the need to physically change the length dimension, or the need to change the positions of a mirror, mirrors or lens in a front partially-obscured reflecting telescopical system. In preferred embodiments this is accomplished by the provision of a module which carries an afocal variator optical system which includes in optical series a first positive lens system, a negative lens system, and a second positive lens system; a front partially-obscured reflecting telescopical system located in optical series in front of the first positive lens system of the afocal variator and supported in a substantially permanent housing one or more module, and a rear element module located in optical series to the rear of the second positive lens system of the afocal variator and in substantially permanent attachment to the housing of the module support system. Within the afocal variator, the negative lens system is so positioned and so controlled that it is capable of being moved continuously either towards and away from the first positive lens system and towards and away from the second positive lens system of the afocal variator optical system and the length of the module remains substantially constant.

A partially-obscured reflecting telescopical system is defined as any selected from the group Newtonian, Cassegrain, Ritchey-Chretien, Gregorian and any of their derivatives, including catadioptric derivatives, such as Maksutov and Schmidt types, in which the incoming light is obscured by a central disk with reflecting obverse side, diagonal mirror or pick-off mirror essentially on-axis to the incoming light.

In one preferred embodiment of the present invention an optical system is provided which may be used as a space-borne astronomical telescope imaging onto a light reactive element in the form of a charge coupled (CCD) pixel array. A front partially-obscured reflecting telescopical system, in this case a Ritchey-Chretien type of 57.6 meters focal length, has its mirrors set in permanent relation for near-focus can be exactly achieved by telemetry from the earth. This is accomplished by providing the optical system of the present invention with said Ritchey-Chretien partially-obscured reflecting telescopical system and a rear module of light-reactive material, in this case, a CCD array or multiple CCD arrays.

In another preferred embodiment, the present invention may be used to correct an existing space-borne partially-obscured reflecting telescope which has been orbited with an incorrectly-figured mirror or mirrors. As a result, the best focus would then exhibit spherical aberration. By supporting the optical system of the present invention on instrument modules designed to be inserted into such telescopes by astronauts or space robots, an astronomical telescope not originally incorporating the afocal optical system of the present invention can be retro-fit. By optically moving the secondary and main mirror of the Ritchey-Chretien space-borne telescope to a new reciprocal relation, the present invention could reposition the focal plane in fact onto the previously-calculated focal plane of the space-borne astronomical telescope.

The system of the present invention uses an independent non-image forming modular optical afocal variator lens system which does not comprise a portion of the image-forming optics in the partially obscured reflecting telescopical systems in which it is included. The system of the present invention is not formula-specific. If the afocal variator of the present invention, which includes a movable lens for purposes of focusing the entire system, were initially included in a partially obscured reflecting telescopical systems, and then subsequently removed in its entirety, the remaining partially obscured reflecting telescopical systems modules would be substantially unaffected, and the remaining system components would still function for their intended purpose as a partially obscured reflecting telescopical system.

The afocal variator module of the present invention can be put into substantially any partially obscured reflecting telescopical optical system into which it can be physically fit with substantial disregard for formula specificity. If the afocal variator module were to be removed from the modular optical systems of the present invention, it would not substantially change the characteristics of the optical system in which it had formerly been placed. For example, where the afocal variator module is positioned in a partially obscured reflecting telescopical system between a front reflecting mirror system and a rear light sensitive system it can be used to focus the telescope. However, if the afocal variator lens system of the present invention were to be removed from such a telescope the remaining system would still function as a partially obscured reflecting telescopical system.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PRIOR ART

Figure 1:
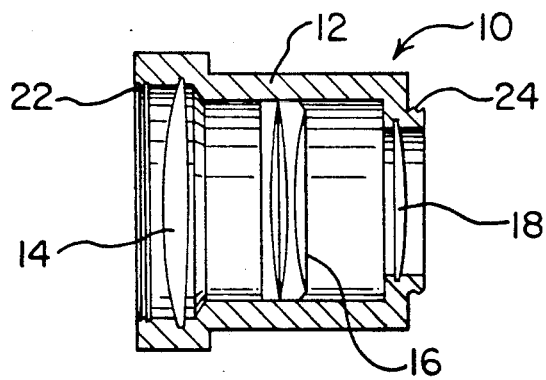
FIG. 1 is a diagrammatic view which illustrates the prior art fixed length afocal variator optical system module which is used in the practice of the present invention.

Referring to FIG. 1 there is shown, primarily for reference purposes, the basic teaching of the parent applications, of which this application is a continuation-in-part. Shown in is an optical system, consisting of an afocal variator modular optical system 10, shown diagrammatically, in cross-section. As illustrated, the afocal variator optical system 10 consists of a fixed length tube 12 in which there is located a front positive lens system 14, a central negative lens system 16, in this case a negative doublet, and a rear positive lens 18. Front positive lens 14 and rear positive lens 18 are secured to tube 12 in a manner such that the distance between them is substantially fixed. However, negative lens 16 is located within tube 12 and constructed in such a manner that it can be moved continuously within tube 12 up and back between front lens 14 and rear lens 18. That is, negative lens 16 is capable of being moved towards and away from front lens 14 and is also capable of being moving towards and away from rear lens 18. Negative lens 16 may be moved within tube 12 by a linear slider, a helical slider, or by any other art known means for providing continuous linear motion to a lens.

The foregoing is made possible by the system for holding the lenses of the afocal variator optical system 10. This holding system may consist of tube 12, as shown, or of any other lens holding system, such as a lens positioning platform system of the type that is well known in the art, or the like. As shown, tube system 12 includes front connecting means, in this case a series of female threads 22 and rear connecting means, in this case a series of male threads 24, to which a front optical system (not shown) and rear optical system (not shown) can be appropriately connected by means of their own respective male and female thread connectors.

Any of the lenses in the afocal variator 10 can be constructed of multiple elements, for example, the front positive lens 14 of three elements, the central negative lens 16 of four elements and the last positive lens 18 of two elements, and so on, as long as the system consists of a positive-movable negative-positive optical system module, and not the combination of optical elements used.

The combination of an afocal variator optical system module 10 with a front optical system module, not shown, as taught by the parent applications, is believed to have the unique feature of altering or varying the actual focal length of such a front optical system, whether in the form of a real image, as provided by a positive lens, or in the form of a virtual image as provided by a negative lens or a convex mirror. The resulting variation of the focal length effects the convergence or divergence of the light which exits from afocal variator 10, and therefore of the light (or image) which exits from the rear of afocal variator optical system 10. This allows the focus of the system to be changed without changing the length of the overall system or of any modular element in the system, and without changing the mirrors or lenses in the front or rear of the afocal variator modular system 10.

DESCRIPTION OF THE PREFERRED EMBODIMENTS

Figure 2:
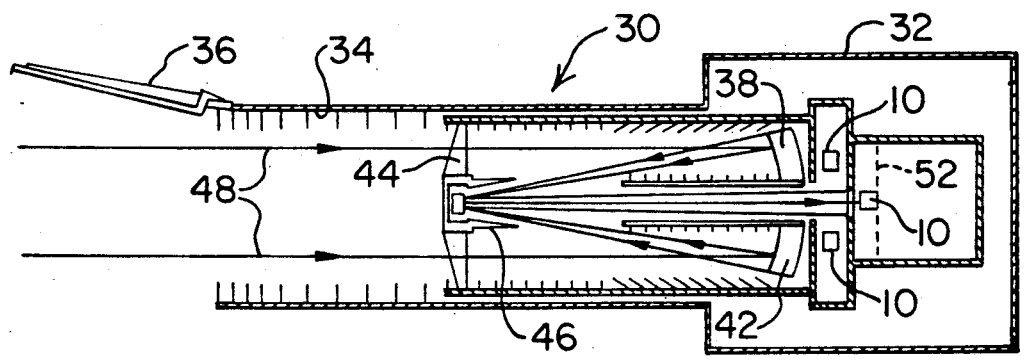
FIG. 2, shows a cross-sectional, diagrammatic representation of one form of a partially obscured reflecting telescope, or other mirrored optical system in which a focusing module is located in combination with such other components as are required to provide a focusable partially obscured reflecting telescope, or other optical system.

Now referring to FIG. 2, there is shown the present invention in which a cross-sectional diagrammatic representation of a portion of the Hubbel Space Telescope 30, is set forth. The Hubbel system 30 is a Ritchey-Chretien form of Cassegrain partially obscured reflecting telescope. A housing 32 is provided to which the telescope system is mounted. Housing 32 also includes such support instrumentation, energy systems, communication systems, and other art known elements, not shown, as are required to operate the Hubbel system 30. A telescope support tube 34 is connected to support housing 32. Support tube 34 includes, at one end, a remotely operated trap door 36, which can be opened or closed by remote command to allow light to enter the telescope support tube 34.

Within the telescope support tube 34 at an end opposed to trap door 36, is a primary reflecting mirror 38. Primary mirror 38 is concave and includes a central opening 42. Within support tube 34, intermediate trap door 36 and primary concave reflecting mirror 38, is located a secondary convex mirror 44. Secondary mirror 44 includes on its surface which faces primary mirror 38 a series of art known light baffles 46. Electro-magnetic radiation, such as light, as indicated by the arrows 52 enter telescope support tube 34, bypass secondary mirror 44, impinge upon primary mirror 38, are collimated and reflected from secondary mirror 44 and pass through central opening 42 in primary mirror 38 to focal plane 52.

Focal plane 52 carries light reactive elements or material, such as CCD pixel array. In normal operations, the geometry defining the location of mirrors 38, 46, and focal plane 52, are such that a focused image is displayed at focal plane 52 for subsequent processing, e.g. transmission, formation of a photograph, or viewing by an observer. Should the geometry and the location of the mirrors 38, 46, and focal plane 52, be miscalculated, the images received at focal plane 52 will be distorted or incomplete or otherwise incapable of providing a coherent image at focal plane 52. Were the system as remote, for example in orbit around the earth, correction of such focusing problems will be both difficult and expensive. However, by locating an afocal variator module 10, either actually, or actually displaced, as shown in FIG. 2, the distorted images can be easily focused onto focal plane 52.

Figure 3:
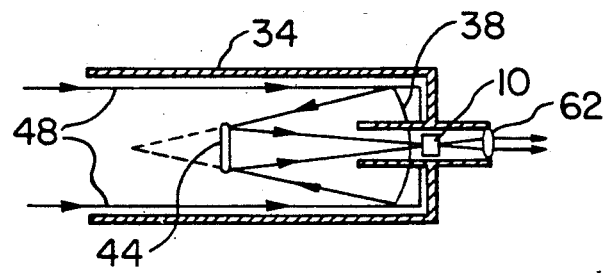
FIG. 3, is a cross-sectional, diagrammatic representation of another form of a partially obscured reflecting telescope.

Referring now to FIG. 3, another form of Cassegrain telescope system is shown, in which like parts have like numbers. However, in this modification, the system is intended for viewing through a lens system 62. As with the system of FIG. 2, an afocal variator module 10 may be located within the system for use in correcting any focusing distortion.

In another embodiment, not shown, the present invention may be used as a replacement for the "repeater" telescopes commonly used in space-borne wide field/planetary cameras and other cameras which require secondary, supplemental focusing devices to focally compress, expand, aberrationally control and refocus, the light from a main telescope. These repeaters are usually on the order of 30% contrast loss and a further coarsening of the Airy disc pattern. For example, the present invention could have been, or could be used, to focus the Wide Field/Planetary camera of the Hubbel Space Telescope, replacing the existing obscured small Ritchey-Chretien repeater telescopes presently utilized. Since the optical system of the present invention is taught as an unobstructed system, the contrast losses and coarsening of the Airy disc pattern would not be affected by a central obstruction. This would result in a contrast increase, as well as a smaller spot size for the Airy disc, thereby improving the resolution of the camera with respect to the main telescope.

The Afocal Variator can be used with supplemental options either in front, in back, either or both, to correct for spherical aberration, astigmatism, coma and other optical aberrations, as well as optics so positioned to achieve focal expansion or compression.

It is therefore seen that the present invention provides an optical system in which the afocal variator optical system of the present invention alters the focal length, and therefore, the power of front partially-obscured reflecting telescopical system. This modifies the front partially-obscured reflecting telescopical system as if either an infinite number of lenses had been put in the place of the afocal variator to either focally compress or expand the focal length of said telescope, or as though a substantial variable length of separation is provided between the front partially-obscured reflecting telescopical system and the rear module supporting a light-reactive material.

To summarize, the modular afocal variator module of the present invention can be positioned in any operational optical instrument between a front optical system and a rear optical system, provided that there is enough physical space to do so, and it can and will then serve to focus that instrument to some degree or another.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. A modular optical system including in combination a front element module which carries an all-mirror reflective optical system and a rear system module which carries a light-reactive material, and wherein said front element module and said rear element module together define an operational optical instrument, and a module which carries a lens system, said lens system module being intermediate said front element module and said rear element module, the actual focal length of said all-mirror reflective element module carried by said front element module varied with respect to said light-reactive material carried by said rear module, without changing the length dimension of the modular optical system, without changing the length dimension of the modules, without changing the mirror or mirrors of the front module, and without changing the position of the rear module, wherein the improvement comprises: said optical system carried by said lens system module includes an afocal variator, and wherein connecting means are carried by said lens system module, whereby said lens system module, said front element module, and said rear element module can be connected in optical series.

2. The modular optical system of claim 1, in which said front module is of such size, that said afocal variator carried by said lens system module can be optically connected in series to said front module while also being mechanically connected to said front module.

3. The modular optical system of claim 1, wherein said all-mirror reflective element is selected from the group consisting of single-element positive reflector, single-element negative reflector, Newtonian telescopical system, Cassegrainial telescopical system, Ritchey-Chretien telescopical system or Gregorian telescopical system, all of which contain primary and secondary mirrors, said secondary mirrors partially obscuring the total amount of incoming light entering said systems.

4. The modular optical system of claim 1, wherein said rear element module's light-reactive material is selected from any of the group consisting of a photographic plate or emulsion, a video sensor, a charged-coupled device (CCD), an image intensifier, an ultraviolet detector or sensor, an infrared detector or sensor.

5. The modular optical system of claim 2, wherein said rear element module's light-reactive material is selected from any of the group consisting of a photographic plate or emulsion, a video sensor, a charged-coupled device (CCD), an image intensifier, an ultraviolet detector or sensor, an infrared detector or sensor.

6. The modular optical system of claim 1, wherein said negative lens in said afocal variator optical system is a negative doublet lens.

7. The modular optical system of claim 2, wherein said negative lens in said afocal variator optical system is a negative doublet lens.

8. The optical system of claim 1, wherein the said rear element module is selected from a light-tight box, a camera or a supportive panel or screen.

9. The optical system of claim 2, wherein the said rear element module is selected from a light-tight box, a camera or a supportive panel or screen.

10. The modular optical system of claim 1, wherein said lens system module can be moved in or out of the optical axis with respect to the rear element module.

11. The modular optical system of claim 2, wherein said lens system module can be moved in or out of the optical axis with respect to the rear element module.

12. The modular optical system of claim 1, wherein said lens system module may be used alternately with another lens system module, the lens elements of which are composed of a material or materials with different refractive indices, dispersive characteristics and special transmittance from the original lens system module.

13. The modular optical system of claim 2, wherein said lens system module may be used alternately with another lens system module, the lens elements of which are composed of a material or materials with different refractive indices, dispersive characteristics and special transmittance from the original lens system module.

14. The modular optical system of claim 2, in which the front element module mirror or mirrors are maintained in permanently fixed position.

15. The modular optical system of claim 1, in which the module afocal variator is positioned in front of any of the group consisting of a flat mirror, a negative mirror, a positive mirror, a shutter device, a prism, a repeater telescope of Newtonian, Cassegrainian, Ritchey-Chretien or Gregorian or off-axis catoptric configuration an optical flat, a single positive lens, a doublet positive lens having its convex surface forward, a doublet positive lens having its convex surface rearward, a double convex doublet positive, a double concave doublet positive, a single negative lens, a doublet negative lens having its convex surface forward, a doublet negative lens having its convex surface rearward, a convex doublet negative lens, a double concave doublet negative lens, at least two spaced apart lens systems which provide a positive optical effect, and at least two spaced apart lens systems which provide a negative optical effect, all of which are positioned in front of the focal plane of the modular optical system.

16. The modular optical system of claim 2, in which the module afocal variator is positioned in front of any of the group consisting of a flat mirror, a negative mirror, a positive mirror, a shutter device, a prism, a repeater telescope of Newtonian, Cassegrainian, Ritchey-Chretien or Gregorian or off-axis catoptric configuration an optical flat, a single positive lens, a doublet positive lens having its convex surface forward, a doublet positive lens having its convex surface rearward, a double convex doublet positive, a double concave doublet positive, a single negative lens, a doublet negative lens having its convex surface forward, a doublet negative lens having its convex surface rearward, a convex doublet negative lens, a double concave doublet negative lens, at least two spaced apart lens systems which provide a positive optical effect, and at least two spaced apart lens systems which provide a negative optical effect, all of which are positioned in front of the focal plane of the modular optical system.

17. An integrated optical system including in optical series an afocal variator optical system as a module, a front element module which carries an all-mirror optical system and a rear system module which carries a light-reactive material which said front element module and rear element module together define an operational optical instrument, said integrated optical system having the ability to have its actual focal length vary without the need to physically change the length dimension of any of its said constituent optical system elements, without the need to physically change the mirror position or positions in the front element module, without the need to physically change the position of the rear module, wherein: said module afocal variator optical system element includes in optical series a first positive lens, a negative lens and a second positive lens, said negative lens being so positioned and so controlled that it is capable of being moved towards and away from said first positive lens and towards and away from said second positive lens, and wherein the distance between said first positive lens and said second positive lens of said afocal variator optical system element remains substantially constant.

18. An integrated optical system including in optical series an afocal variator optical system as a module, a front element module which carries a catadioptric optical system and a rear system module which carries a light-reactive material which said front element module and rear element module together define an operational optical instrument, said integrated optical system having the ability to have its actual focal length vary without the need to physically change the length dimension of any of its said constituent optical system elements, without the need to physically change the mirror position or positions, lens or lens positions, in the front element module, without the need to physically change the position of the rear module, wherein: said module afocal variator optical system element includes in optical series a first positive lens, a negative lens and a second positive lens, said negative lens being so positioned and so controlled that it is capable of being moved towards and away from said first positive lens and towards and away from said second positive lens, and wherein the distance between said first positive lens and said second positive lens of said afocal variator optical system element remains substantially constant.

* * * * *